Figure 1:
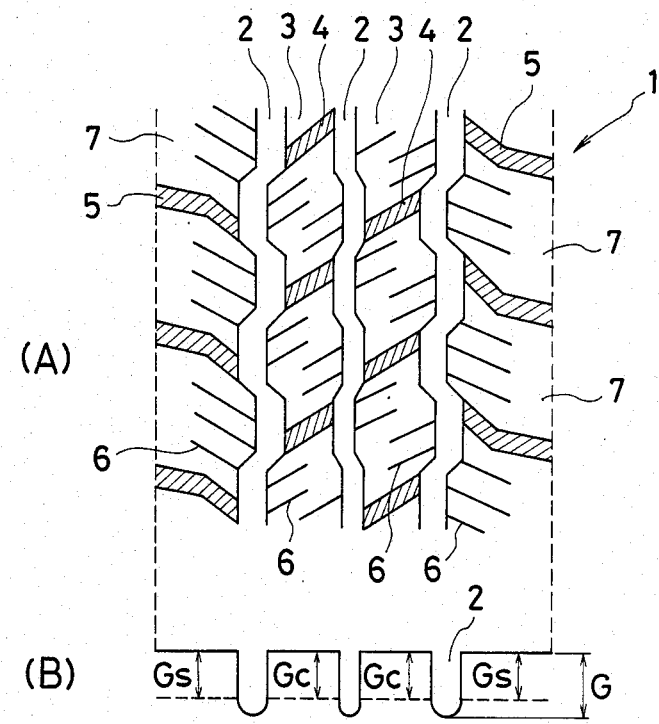

United States Patent [19]

Kogure et al.

[11] Patent Number: 4,649,975
[45] Date of Patent: Mar. 17, 1987

[54] PNEUMATIC TIRE TREAD

[75] Inventors: Tomohiko Kogure, Minami-ashigara; Tadayoshi Hiraga, Hiratsuka; Riichiro Mama, Sagamihara; Nobuhito Takasugi, Hiratsuka, all of Japan

[73] Assignee: The Yokohama Rubber Co., Ltd., Tokyo, Japan

[21] Appl. No.: 749,689

[22] Filed: Jun. 28, 1985

[30] Foreign Application Priority Data

Jun. 30, 1984 [JP] Japan .................................. 59-135857

[51] Int. Cl.$^4$ .............................................. B60C 11/00
[52] U.S. Cl. ................................................ 152/209 R
[58] Field of Search ......... 152/209 R, 209 D, DIG. 3

[56] References Cited

U.S. PATENT DOCUMENTS 3,559,712  3/1969  Verdier ........................... 152/209 R
4,230,512 10/1980  Makino et al. .................. 152/209 R
4,353,402 10/1982  Burche et al. ................... 152/209 R
4,515,197  3/1985  Motomura et al. ............. 152/209 R Primary Examiner—Michael Ball
Attorney, Agent, or Firm—Armstrong, Nikaido, Marmelstein & Kubovcik

[57] ABSTRACT

A pneumatic tire having a tread portion with a tread pattern which is constituted by main grooves, auxiliary grooves, lug grooves and sipes, wherein the mean depth Gc of the auxiliary grooves, the mean depth Gs of the lug grooves and the mean depth Gk of the sipes are determined in relation to the mean depth G of the main grooves so as to meet the following conditions:

$Gk/G = 0.65$ to $0.85$ $Gc/G = 0.7$ to $0.8$ $Gs/G = 0.8$ to $1.0$

1 Claim, 3 Drawing Figures

PNEUMATIC TIRE TREAD

BACKGROUND

The present invention relates to a pneumatic tire having a tread surface which is provided with a tread pattern constituted by sipes, auxiliary grooves and lug grooves, the sizes of which are determined at specific ratios to the depth of the main groove. More specifically, the invention is concerned with all season tires which are suited to use both on a snowy road and a paved road.

In conventional snow tires, the tread pattern is designed such that both the grooves and the sipes have greater depths than those in ordinary tires. The conventional snow tires, therefore, exhibit a small rigidity and, hence, their steerability and stability are poor particularly on paved roads. This causes some problems particularly when the road is partly covered with snow such that the pavement appears discontinuously. Under these circumstances, studies have been made to develop snow tires which exhibit superior steerability and stability on paved roads, in order to allow vehicles to run both on snowy roads and roads where the pavement is revealed.

These tires, however, have not been improved so as to satisfactorily overcome the unfavourable effects produced by the tire rigidity on the tire performance on snowy and paved roads.

More specifically, in these snow tires, the numbers of tread grooves and sipes are increased so as to improve the tire performance on snowy roads and, at the same time, the depths of the tread grooves and the sipes are partially reduced so as to improve the performance on paved roads. This type of tires exhibit a satisfactory performance both on snowy and paved roads when the tire is still new. However, as the tire is worn down, the rigidity of the tread is drastically increased to cause a rapid lowering of the tire performance on snowy roads. Although a progressive impairment of the tire performance to some extent is unavoidable, a drastic lowering of the tire performance causes a serious problem from the view point of safety.

SUMMARY

Accordingly, it is an object of the present invention to provide a pneumatic tire which exhibits an excellent performance both on snowy roads and paved roads.

To this end, according to the invention, there is provided a pneumatic tire having a tread portion with a tread pattern which is constituted by a plurality of circumferential main grooves having a mean depth; a plurality of auxiliary grooves connecting adjacent main grooves so as to form a plurality of rows of blocks in the center of the tread; a plurality of lug grooves formed on each shoulder of the tire and extended between the adjacent side of the tire and the adjacent main groove so as to form a row of blocks on each shoulder; and a plurality of sipes formed in each block of each row of the blocks, wherein the depths of the grooves and sipes are selected to meet the following conditions:

$Gk/G = 0.65$ to $0.85$ $Gc/G = 0.7$ to $0.8$ $Gs/G = 0.8$ to $1.0$ where, $Gc$ represents the mean depth of the auxiliary grooves, $Gs$ represents the mean depth of the lug grooves, $Gk$ represents the mean depth of the sipes, and $G$ represents the mean depth of the main groove.

The above and other objects, features and advantages of the invention will become clear from the following description of the preferred embodiments which will be described hereinunder.

THE DRAWINGS

Figure 2:
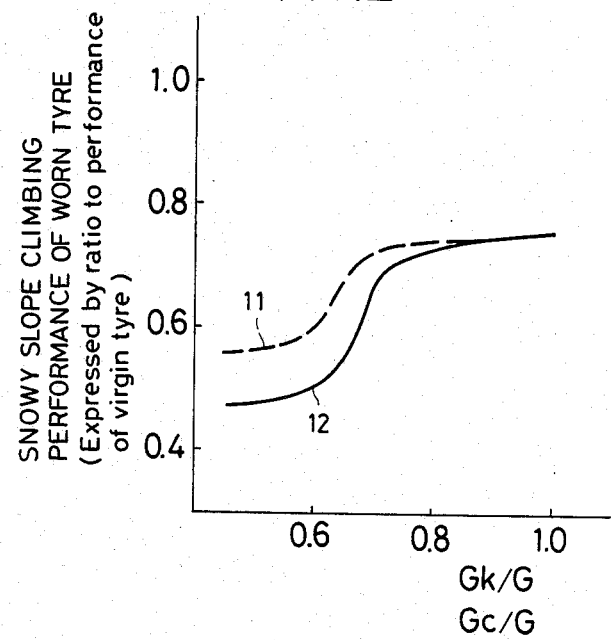
Figure 3:
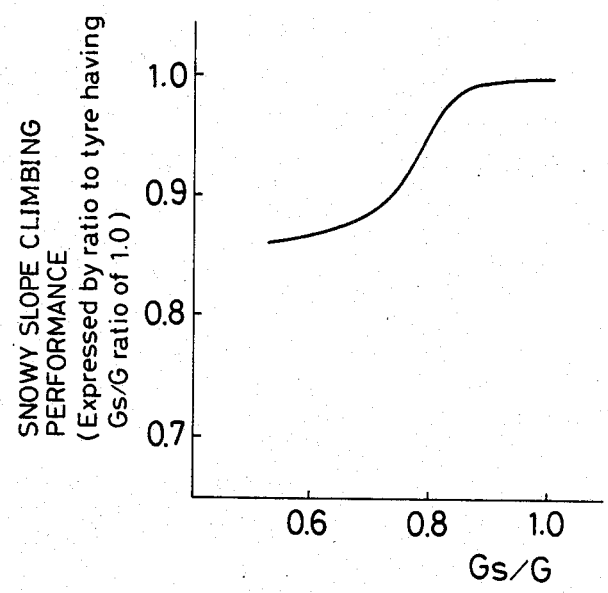

FIGS. 1(A) and 1(B) are respectively a plan view and a sectional view of a tread pattern formed on the tread surface of a pneumatic tire in accordance with the invention; and FIGS. 2 and 3 are graphs showing the snowy slope climbing performance of the pneumatic tire shown in FIGS. 1(A) and 1(B).

THE PREFERRED EMBODIMENTS

Referring to FIGS. 1(A) and 1(B), a tread pattern 1 has three main grooves 2 extending in the circumferential direction. These main grooves have a mean depth $G$. Adjacent main grooves 2 and 2 are connected by means of auxiliary grooves 4 so that two rows 3 and 3 are formed on the center of the tread.

The mean depth $Gc$ of the auxiliary grooves 4 is slightly smaller than the mean depth $G$ of the groove 2. Lug grooves 5 are formed on each shoulder of the tire tread such as to extend from each side to the adjacent main groove 2 thereby forming a row of blocks 7 on each shoulder. The lug grooves 5 have a mean depth $Gs$ which is slightly smaller than the mean depth $G$ of the main grooves 2. The rows 3 and 7 of the blocks are provided with sipes 6, more densely than in ordinary tire, intended for use on paved roads. The sipes 6 have a mean depth $Gk$ (not shown) which is slightly smaller than the mean depth $G$ of the main grooves. This tread pattern generally exhibits an excellent performance on snowy roads. However, if the mean depths $Gc$, $Gs$ and $Gk$ of the auxiliary grooves 4, lug grooves 5 and the sipes 6, respectively, are substantially equal to the mean depth $G$ of the main grooves 2, a virgin tire exhibits a poor performance, particularly an inferior driving stability, when used on a paved road. On the other hand, if the depths of the auxiliary grooves 4, lug grooves 5 and the sipes 6 are small, the performance on snowy roads is drastically impaired when the tire is worn down.

In view of the above, according to the invention, the mean depths $Gc$, $Gs$ and $Gk$ of the auxiliary grooves 4, lug grooves 5 and the sipes 6, respectively, are so selected in relation to the mean depth $G$ of the main grooves 2 as to meet the following conditions:

$Gk/G = 0.65$ to $0.85$ $Gc/G = 0.7$ to $0.8$ $Gs/G = 0.8$ to $1.0$

By virtue of this feature, the tire of the invention provides the following advantageous results:

(a) The tire has a tread surface which has a tread pattern in which the depths of auxiliary grooves, sipes and lug grooves are so selected as to be slightly smaller but not much smaller than the mean depth of main grooves. The tire, therefore, exhibits a superior performance on paved roads as compared with conventional snow tires.

(b) Superior performance on snowy road can be maintained even after the groove depth has been reduced as a result of wear of the tire.

These advantages of the invention will become more clear from the following description of an example in comparison with a reference example.

Example and Reference Example:

Tires having a tread pattern as shown in FIGS. 1(A) and 1(B) were produced and subjected to tests for evaluation of the snowy slope climbing performance.

(1) The ratio Gs/G between the mean groove depth Gs of lug grooves 5 and the mean depth G of the main groove 2 was fixed at 0.9, and tests were conducted to examine the snowy slope climbing performance using the mean depth Gk of the sipes 6 as a parameter. More specifically, tests were conducted by measuring the time required for a vehicle to run a distance of 200 m on a snowy slope of 7° and calculating the mean speed of the vehicle, by using both virgin tires and worn tires. The worn tires were prepared by buffing the tires until the depth of the main grooves is reduced to ½.

FIG. 2 shows the result of this test.

In FIG. 2, the axis of abscissa shows the values obtained by dividing the depths Gc and Gk by the depth G, while the axis of coordinate showing the performance. Numerals 11 and 12 denote, respectively, the sipes and the auxiliary grooves in the central part of the tread.

It will be seen from FIG. 2 that the worn tires exhibit a snowy slope climbing performance, which is lower by about 25% as compared with the virgin tire, when the depths Gc and Gk are equal to the depth G of the main groove, i.e., when the condition of Gc/G=Gk/G=1.0 is met. At the same time, it will be seen that the worn tire exhibits a drastic reduction of the snowy slope climbing performance as the ratio Gc/G or Gk/G is decreased. Regarding the auxiliary groove 4 in the tread center, the performance is drastically impaired as the ratio Gc/G is reduced down below 0.70. As to the sipe 6, the performance is drastically decreased when the ratio Gk/G is reduced down below 0.65.

The reduction in the snowy slope climbing performance of the worn tire becomes serious when the mean depth Gk of the sipe becomes smaller than 0.5 G. Representing the minimum sipe depth by gk, therefore, it is desirable that the condition of gk/G≧0.5 is met. The same applies also to the case of the depth gc of the auxiliary groove having the minimum depth. Namely, it is preferred that the condition of gc/G≧0.5 is met.

(2) The depth Gs of the lug groove affects more seriously, on the snowy slope climbing performance of the virgin tire than on that of the worn tire.

FIG. 3 shows results of tests similar to those explained in connection with FIG. 2, conducted for the purpose of examining the relationship between the snowy slope climbing performance of the virgin tire and the ratio Gs/G.

From this FIG. 3, it will be seen that when Gs/G is less than 0.8, the virgin tire exhibits an unsatisfactory snowy slope climbing performance. It will be seen also that the snowy slope climbing performance is quite unsatisfactory when the ratio gs/G is less than 0.7, where gs represents the depth of the lug groove having the minimum depth.

On the other hand, the steering stability on paved roads is increased as the ratios Gk/G, Gs/G and Gc/G are reduced. More specifically, the ratio should be less than 0.85 at the greatest, preferably less than 0.8, while the ratio Gc/G should be less than 0.8. It is to be noted that the lug groove depth Gs represents the mean depth of the lug grooves in the road contacting surface of the tire.

(3) Table 1 below shows results of feeling tests which were conducted to examine the performance of virgin tires on paved and snowy roads, as well as the performance of worn tires on the snowy road, with parameters of Gk/G, Gs/G and Gc/G. The best result is shown by 5 (five points), and practically usable region is given points 3 (three or greater).

TABLE 1

| Sample No. | Gk/G | Gc/G | Gs/G | Evaluation 5-point method | | | Remarks |
| --- | --- | --- | --- | --- | --- | --- | --- |
| | | | | NEW | NEW | ½ | |
| 1 | 1.0 | 1.0 | 1.0 | 2.0 | 4.0 | 3.5 | Reference Example |
| 2 | 0.75 | 0.75 | 0.9 | 3.0 | 3.5 | 3.0 | Example |
| 3 | 1.0 | 0.75 | 0.9 | 2.5 | 3.5 | 3.0 | Reference Example |
| 4 | 0.75 | 1.0 | 0.9 | 2.5 | 3.5 | 3.0 | Reference Example |
| 5 | 0.75 | 0.75 | 0.7 | 3.5 | 2.5 | 2.0 | Reference Example |
| 6 | 0.5 | 0.5 | 0.9 | 3.5 | 3.0 | 2.0 | Reference Example |

In Table 1 above, the sample No. 1 represents a tire in which all auxiliary grooves, lug grooves and the sipes have a depth equal to the depth of the main grooves. This tire shows a generally good performance on snowy roads, regardless of whether the tire is virgin or worn down, but the performance on paved roads is rather inferior. The sample No. 3 represents a tire in which only the sipes have a depth equal to the depth of the main groove, while other grooves have depths slightly smaller than that of the main groove. This tire exhibits a performance on snowy roads which is rather inferior to that shown by the sample No. 1 but is still practically acceptable. However, the performance of this tire on paved roads is rather superior as compared with the sample No. 1 but is still impractical. Like sample No. 3, sample No. 4 is also unsatisfactory on paved roads. Sample Nos. 5 and 6 represent tires in which the depths Gk, Gc and Gs are selected to be extremely small as compared with the depth of the main grooves. These tires exhibit a superior performance on paved roads but shows a rather poor performance on snowy roads both when they are virgin and worn down. In comparison with these samples, the tire of the sample No. 2 shows a satisfactory performance on paved roads, as well as satisfactory performance on snowy roads both in the virgin state and in a worn down state.

What is claimed is:

1. A pneumatic tire having a tread portion with a tread pattern which is constituted by a plurality of main grooves transversely spaced and extending circumferentially around said tire, said main grooves having a mean depth; a plurality of auxiliary grooves extending transversely between and connecting adjacent said main grooves to form a plurality of circumferentially spaced blocks in the center of the tread between said main grooves; a plurality of lug grooves formed on each shoulder of said tire and extended between the adjacent side of said tire and the adjacent main groove to form a row of circumferentially spaced blocks on each shoulder of said tire; and a plurality of sipes formed in each block of each row of said blocks between said main grooves and on each said shoulder, wherein the depths of said grooves and said sipes meet the following conditions;

Gk/G = 0.65 to 0.85

Gc/G = 0.7 to 0.8

Gs/G = 0.8 to 1.0 wherein, G is the means depth of the main grooves, Gc is the mean depth of said auxiliary grooves, Gs is the mean depth of said lug grooves, and Gk is the mean depth of said sipes.

* * * * *